(12) United States Patent
Denis

(10) Patent No.: US 8,335,208 B2
(45) Date of Patent: Dec. 18, 2012

(54) METHOD, SYSTEM AND TRAFFIC NODE FOR MEASURING A LOAD CAPACITY IN A MANAGEMENT SYSTEM

(75) Inventor: Martin Denis, Vaudreuil (CA)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 0 days.

(21) Appl. No.: 12/476,900

(22) Filed: Jun. 2, 2009

(65) Prior Publication Data
US 2010/0302939 A1 Dec. 2, 2010

(51) Int. Cl.
*H04L 12/28* (2006.01)

(52) U.S. Cl. ............... 370/351; 370/230; 370/230.1; 709/222; 709/226

(58) Field of Classification Search .................. None
See application file for complete search history.

(56) References Cited

U.S. PATENT DOCUMENTS

| | | | |
|---|---|---|---|
| 6,222,856 B1 | 4/2001 | Krishnan et al. | |
| 2002/0003806 A1 | 1/2002 | McKinnon, III et al. | |
| 2003/0093462 A1* | 5/2003 | Koskelainen et al. | 709/203 |
| 2003/0174648 A1* | 9/2003 | Wang et al. | 370/235 |
| 2003/0187934 A1* | 10/2003 | Nishikawa et al. | 709/206 |
| 2004/0093512 A1* | 5/2004 | Sample | 713/201 |
| 2007/0121507 A1* | 5/2007 | Manzalini et al. | 370/235 |
| 2008/0151749 A1* | 6/2008 | Kawamura | 370/230 |

FOREIGN PATENT DOCUMENTS

| | | |
|---|---|---|
| WO | 01/35575 A2 | 5/2001 |
| WO | 02/01826 A2 | 1/2002 |
| WO | 2004/028175 A1 | 4/2004 |

OTHER PUBLICATIONS

Vasil Hnatyshin et al., Reducing Load Distribution Overhead with Message Aggregation, IEEE 2003, pp. 227-234.
PCT Search Report from corresponding application PCT/IB2010/052398.

* cited by examiner

*Primary Examiner* — Kibrom T Hailu
*Assistant Examiner* — Zewdu A Beyen
(74) *Attorney, Agent, or Firm* — Alex Nicolaescu; Ericsson Canada Inc.

(57) ABSTRACT

A method for measuring a load capacity in a management system comprises: receiving an indication of a number of data connections through an input; and computing a current load capacity by multiplying the number of data connections with a time period during which the current load capacity is to be computed. A system for carrying out the method comprises an input for receiving the indication and a processor for computing the current load capacity by multiplying the number of data connections with the time period.

16 Claims, 5 Drawing Sheets

| Node TN1 | Node TN2 | Node TN3 | Remarks |
|---|---|---|---|
| 1 | 3 | 8 | No overload, accept connections |
| 1 | 5 | 20 | No overload, accept connections |
| 1 | 7 | 28 | Overload detected, release connections in the next time period |
| 1 | 6 | 22 | Overload over, accept connections in the next time period |

Figure 7

METHOD, SYSTEM AND TRAFFIC NODE FOR MEASURING A LOAD CAPACITY IN A MANAGEMENT SYSTEM

TECHNICAL FIELD

The present invention relates to management systems. More particularly, the present invention is concerned with a method and system for measuring a load capacity in a management system.

BACKGROUND

Throttling is generally used in management systems. The standard way to apply throttling in the context of networked service provisioning or management systems is to use load balancing. Load balancing allows for enhancing the capabilities of response to service requests and data connections and load sharing among different traffic nodes. A general purpose of a load balancing mechanism is to treat a volume of data connections that exceeds the load capacity of a single traffic node. The load balancing mechanism also enables enhanced robustness as it usually involves redundancy between more than one traffic nodes. A typical load balancing mechanism includes a load balancing node, which receives the service requests and data connections and forwards each of them towards further traffic nodes. The distribution mechanism is an important aspect of the load balancing mechanism.

The simplest distribution mechanism is equal distribution (or round-robin distribution) in which all traffic nodes receive, in turn, an equal number of data connections. It is flawed since traffic nodes do not necessarily have the same capacity and since data connections do not necessarily involve the same resource utilization once treated in a traffic node. For example, some data connections may last for only one second and other for many hours.

A proportional distribution mechanism takes into account the capacity of each traffic node, which is used to weight the round-robin mechanism. One problem of the proportional distribution mechanism is that it does not take into account potential complexity variability from one data connection to another and the nature of each data connection.

Another distribution mechanism could be based on systematic pooling of resource availability. The pooling involves a request for the current system utilization from the load balancing node and a response from each traffic node towards the load balancing node. The pooling frequency affects the quality of the end result. Indeed, a high frequency of pooling request is required in order to obtain a significant view of the node's capacity. However, a too frequent pooling is costly on node resources and performance and network utilization while a too infrequent pooling is insignificant.

Also, in current utilization systems, the maximum load capacity of the traffic nodes is generally given by a hard limit, which is a fixed value and cannot be exceeded. The load capacity of the traffic nodes can be usually expressed as a number of data connections per second. Furthermore, in the current systems, performing different throttling for different types of data connections is not possible.

As it can be appreciated, the current load balancing distribution mechanisms do not provide for an accurate picture of the system utilization and there is no efficient way of measuring the load capacity in the traffic nodes. The present invention aims at providing a solution that would enhance load capacity measuring and load balancing distribution.

SUMMARY

According to a first aspect of the present invention, there is provided a method for measuring a load capacity in a management system. The method comprises the steps of: receiving an indication of a number of data connections through an input; receiving a time period during which a current load capacity is to be computed; and computing, by a processor, the current load capacity by multiplying the number of data connections with the time period.

According to a second aspect of the present invention, there is provided a system for measuring a load capacity in a management system. The system comprises: an input that receives an indication of a number of data connections; and a processor that computes a current load capacity by multiplying the number of data connections with a time period during which the current load capacity is to be computed.

According to a third aspect of the present invention, there is provided a traffic node for measuring a load capacity. The traffic node comprises: an input that receives an indication of a number of data connections; and a processor that computes a current load capacity by multiplying the number of data connections with a time period during which the current load capacity is to be computed.

BRIEF DESCRIPTION OF THE DRAWINGS

A more complete understanding of the present invention may be gained by reference to the following 'Detailed description' when taken in conjunction with the accompanying drawings wherein:

FIG. 7 illustrates an example of load balancing data connections in a cluster of nodes over several time periods.

DETAILED DESCRIPTION

Figure 1:
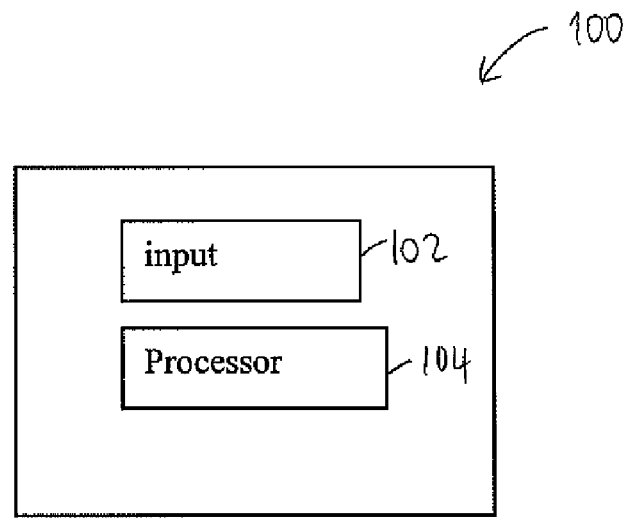
FIG. 1 illustrates a schematic view of a system for measuring a load capacity according to a non-restrictive illustrative embodiment of the present invention.

Before going further into the description, it should be understood that, in the following description, the terms such as connections, requests, and sessions are interchangeable. The connections may be voice, data, video, a combination thereof, etc. They are all referred to as data connections.

Generally stated, embodiments of the present invention provide for an improvement over existing load balancing mechanisms. The embodiments of the present invention present a new feature for measuring the load capacity of traffic nodes so as to better control the load capacity in a utilization/management system over time. The embodiments of the present invention also present a maximum load capacity which is determined by using the new load capacity measurement. The embodiments of the present invention further allows for interaction between traffic nodes by broadcasting their respective load capacity to each other. Furthermore, the nature of each data connection can be taken into consideration, i.e. load balancing and capacity measurement can be performed per category of the data connection. The data connections may be a chat session, a file transfer session (FTP), etc., which have different durations. For example, the different data connections can last for a few milliseconds to a few hours.

More specifically, the embodiments of the present invention use a determined time period to calculate and measure the load capacity for data connections in the traffic nodes. Within the time period, the load capacity is compared against the maximum load capacity. If the load capacity is lower than the maximum load capacity, additional data connections can be accepted by the traffic nodes. If the load capacity is higher than the maximum load capacity, then new data connections will be refused within the time period.

Also, when load balancing over a cluster of traffic nodes is performed over several time periods, a broadcast of the load capacity from each of the traffic node to each other is performed at the end of each time period. The broadcast of the load capacity allows each traffic node to adjust its load capacity according to the other traffic nodes in the next time periods, as will be explained hereinbelow.

Now, turning to FIG. 1, a system 100 for measuring a load capacity in a management or utilization system will be described. The system 100 can be used in a load balancing node or in a traffic node of a communication network, for example.

The system 100, according to a non-restrictive illustrative embodiment of the present invention, comprises an input 102 and a processor 104. The system 100 can comprise additional components (not shown), such as a memory, for performing other tasks and functions, which will not be described as they are not under the scope of the present invention.

The input 102 receives an indication of a number of data connections, the connections being distributed by a load balancing node for example.

The processor 104 allows for computing a current load capacity of a traffic node, for example, by multiplying the number of data connections with a time period. The time period can be defined in the processor 104 or received in the processor 104. In the latter case, the time period can be configured manually, for example.

Figure 2:
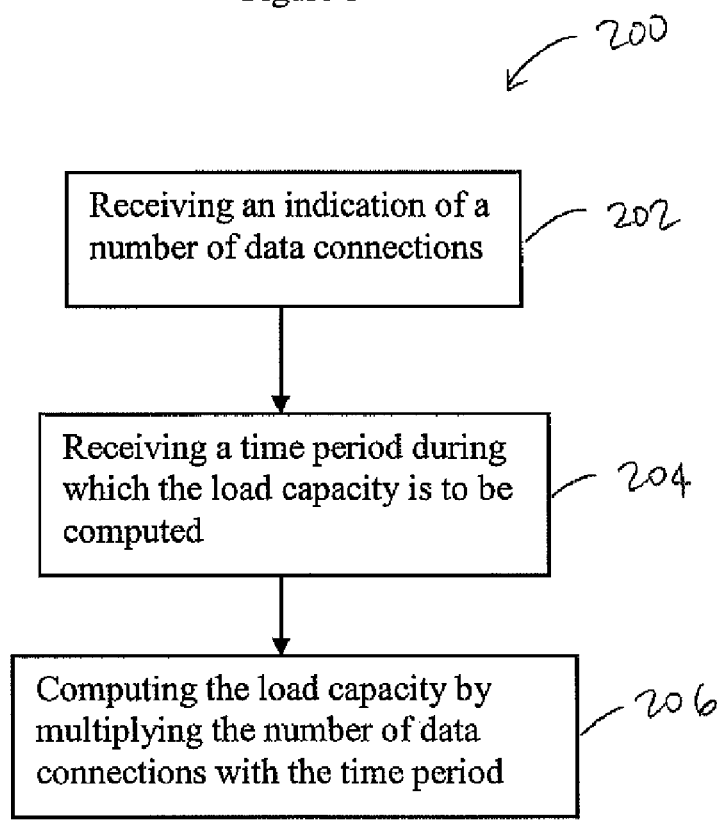
FIG. 2 is a flow chart illustrating a method for measuring a load capacity according to a non-restrictive illustrative embodiment of the present invention.

With reference to FIGS. 1 and 2, a method 200 for measuring a load capacity in a management or utilization system, will be described now.

In step 202, the indication of the number of data connections is received, through the input 102 of the system 100 as illustrated in FIG. 1.

In step 204, first, the time period is received by the processor 104 for which the load capacity is to be computed. Then, the processor 104 computes a current load capacity of the traffic node by multiplying the time period with the number of data connections.

Figure 3:
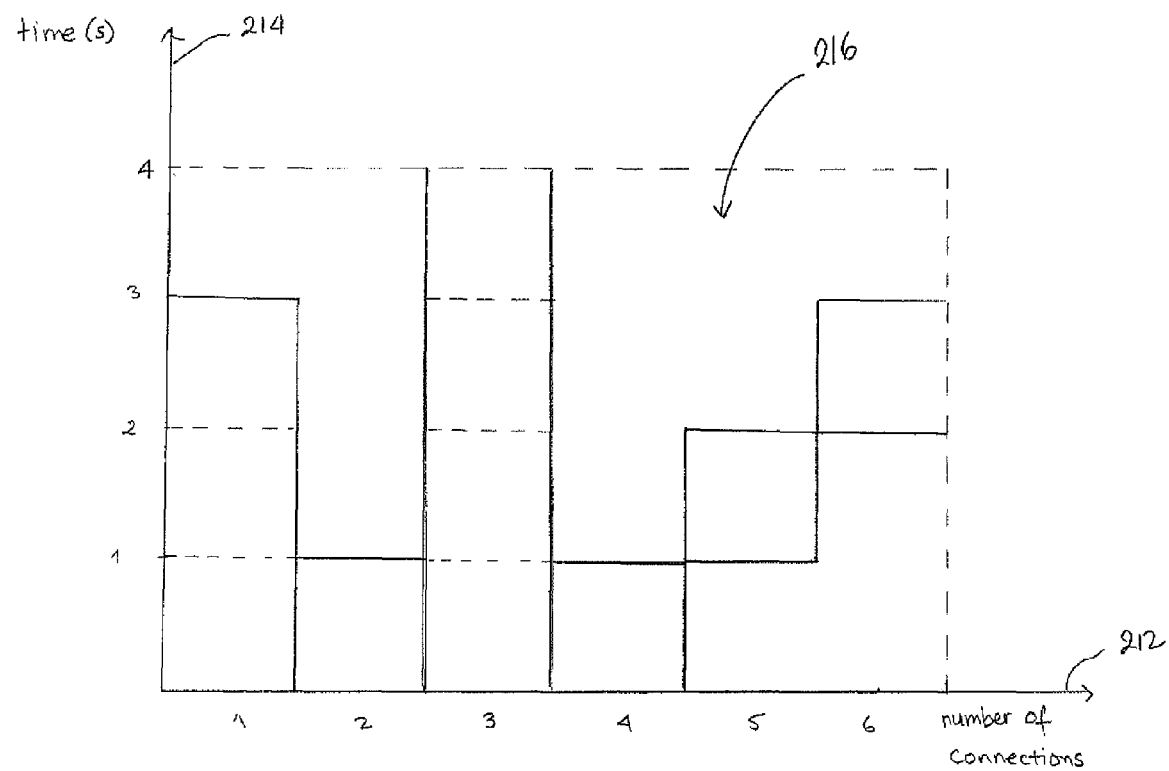
FIG. 3 is an exemplary representation of a load capacity according to a non-restrictive illustrative embodiment of the present invention.

As an example, the load capacity computed according to step 204 of method 200 can be represented as an area 210, as shown in FIG. 3, where in this case, four (4) data connections are open during the first time period of 1 second, for example. In this example, the load capacity can be also referred to as a load capacity area.

It is believed that persons skilled in the art would understand that other representations of the load capacity may be also used.

FIRST EXAMPLE

Next, a first exemplary application of method 200 for measuring the load capacity in a traffic node in the context of throttling will be described. In this case, the system 100 can be implemented in a traffic node for example. Also, a local maximum load capacity for controlling the load capacity of the traffic node can be determined. The local maximum load capacity can be defined as the maximum load capacity of the traffic node over a fixed time period, i.e. the traffic node cannot go beyond that local maximum capacity for that period of time. The local maximum load capacity of the traffic node is computed as the multiplication of a maximum number of data connections with the fixed time period. The maximum number of data connections can be given by a maximum number of licenses granted by a license server, for example. Also, the maximum number of data connections can be given by throttling or policing of incoming IP traffic.

In this case, within the fixed time period, as long as the local maximum load capacity is not reached, the traffic node can accept additional data connections. However, once the local maximum load capacity has been reached, new data connections will be refused, even if the end of the fixed time period has not been reached.

As a concrete example, let's assume that a maximum of 6 data connections are granted to the traffic node and the fixed time period is determined to have a duration of 4 seconds. In this case, the local maximum load capacity would be 24 (=6×4). So, within the time period of 4 seconds, a current load capacity (i.e. the load capacity that has been actually used) cannot be higher than 24. For example, for an accepted data connection that lasts for 2.3 seconds, the current load capacity value of 2.3 (=1×2.3) is deducted from the local maximum load capacity value of 24. After such a data connection, the remaining load capacity is 21.7 (=24−2.3). Thus, each time that a data connection is accepted, the local maximum load capacity decreases until it reaches zero within the time period. Then, new data connections will be refused, even though the end of the time period may not have been reached yet. FIG. 3 shows an example of different data connections, which last for different durations, and which are open and closed over the fixed time period. More specifically, the horizontal axis 212 corresponds to the number of connections and the vertical axis 214 represents the time in seconds (s). The maximum number of connections has been assumed to be 6 and the time period is 4 seconds. The local maximum load capacity is then given by the area 216. The current load capacity of the node is 4 after one second, the current load capacity after 2 seconds is 7, the current load capacity after 3 seconds is 10 and the current load capacity at the end of the time period is 11. The current load capacity at the end of the determined time period can be used to update other nodes through broadcasting, in the case when the traffic node is placed in a cluster of traffic nodes.

As mentioned earlier, as long as the local maximum load capacity is not reached in the time period, new data connections will be accepted. In other words, if the current load capacity (what has been used until a certain point) is lower than the local maximum load capacity, new data connections will be accepted. If the current load capacity is higher than the local maximum load capacity, then new data connections will be refused.

It should be noted that, with the new definition of the load capacity (or the current load capacity), once it is defined with the time period, the system becomes asynchronous, i.e. it does not depend on when exactly within the time period a data connection is established, but only on the duration of that data connection, which will be deducted from the local maximum load capacity within the time period. For example, for a local maximum load capacity of 15, 15 data connections may be established at the first second of the time period for 1 second.

Then, for the rest of the time period, no additional data connections will be accepted. Also, those 15 data connections, which last for a second, can be established so as to cover every second of the time period, i.e. 5 data connections are open in the first second of the time period and closed at the end of the first second, 5 other data connections are open in the next second and closed at the end of the second and finally the remaining 5 data connections are open in the last second of the time period. Thus, areas defined by the connections multiplied by their durations add up to each other so as to reach the area defined for the local maximum load capacity.

Also, a local maximum load capacity can be defined for each type of data connections, such as chat sessions, http, FTP, etc. Thus, for each type of data connections, a current load capacity and a local maximum load capacity can be associated therewith.

SECOND EXAMPLE

Figure 5:
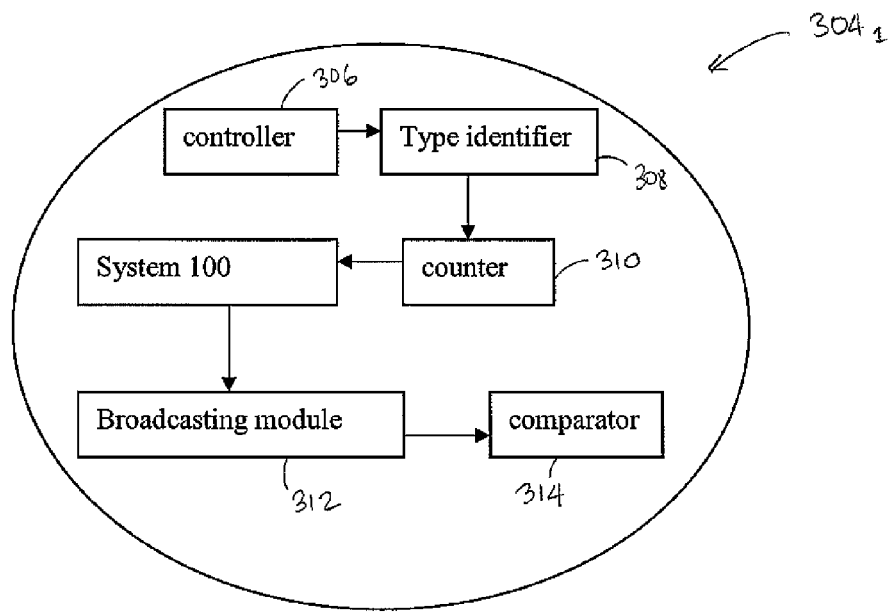
FIG. 5 is a schematic view of a traffic node according to a non-restrictive illustrative embodiment of the present invention.
Figure 6:
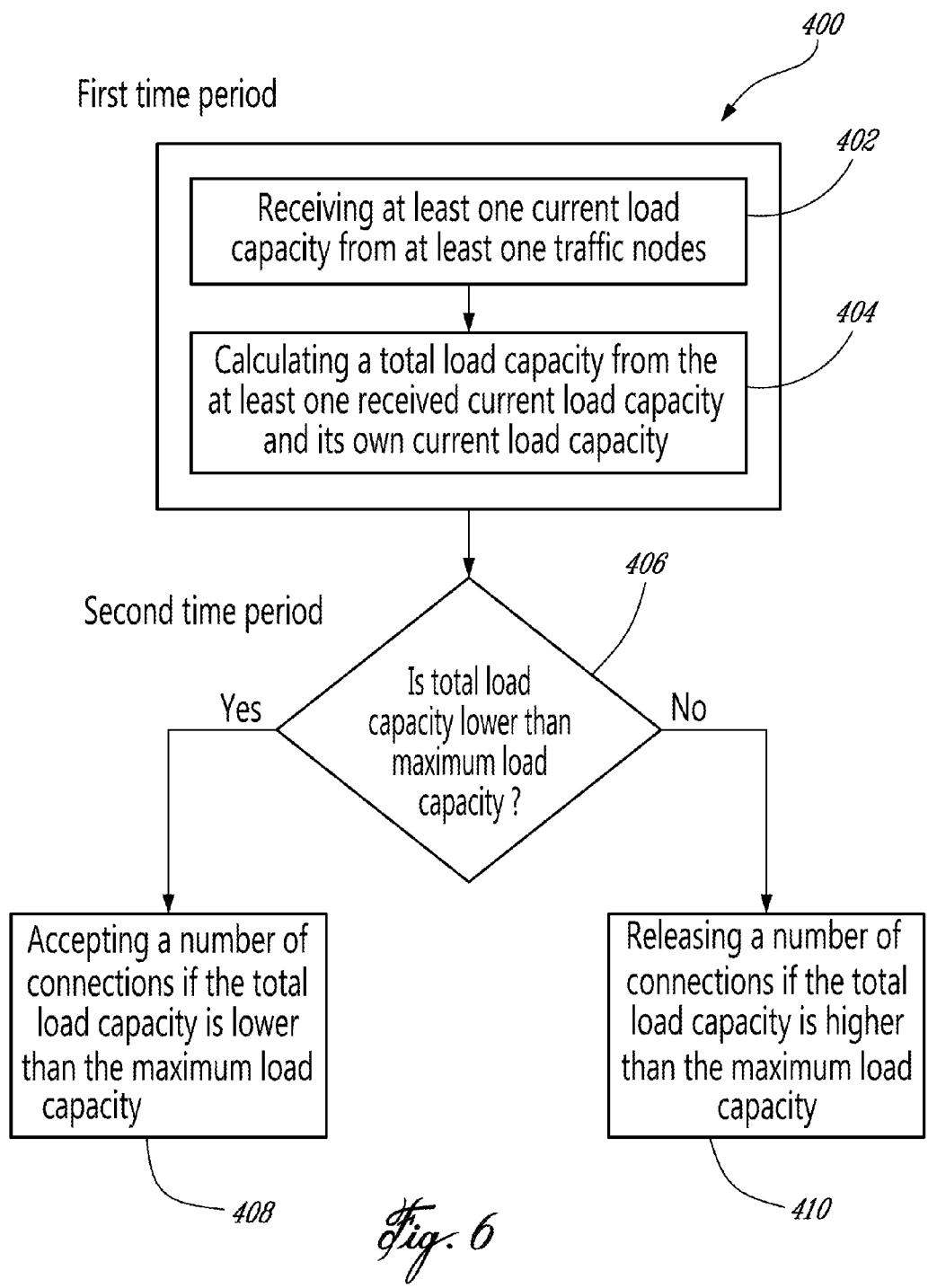
FIG. 6 is an exemplary flow chart of a method for load balancing according to a non-restrictive illustrative embodiment of the present invention.

A second application example of method 200 will be now described with reference to FIGS. 4, 5 and 6.

Figure 4:
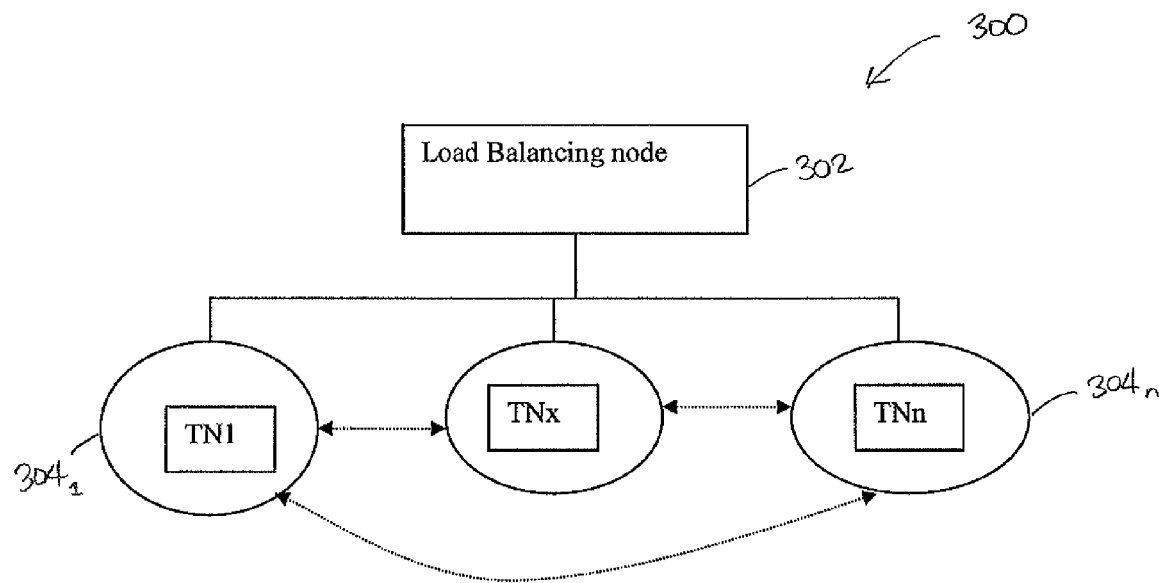
FIG. 4 is an exemplary architecture diagram of a load balancing network according to a non-restrictive illustrative embodiment of the present invention.

Turning to FIG. 4, a system or architecture diagram of a load balancing network 300, in which the system 100 of FIG. 1 can be implemented, in accordance with the teachings of the present invention, is illustrated. The exemplary load balancing network 300 of FIG. 4 is shown with a load balancing node 302 and a cluster of traffic nodes $304_1$ to $304_n$, n being an integer and its value being dependent on the size and characteristics of a specific network.

The load balancing node 302 distributes the data connections that it receives, from a web server for example, to the cluster of traffic nodes $304_1$ to $304_n$. The distribution mechanism can be a round-robin distribution or any other types of distribution mechanisms.

However, unlike in the current load balancing systems, the traffic nodes $304_1$ to $304_n$ communicate with each other so as to broadcast their capacity information to each other at the end of a time period. For example, the traffic nodes $304_1$ to $304_n$ can use UDP (User Datagram Protocol) as the communication protocol. Of course, people skilled in the art would understand that other communication protocols can be used as well between the different traffic nodes $304_1$ to $304_n$.

It is well-known that the data connections are of different natures and durations. For example, a chat session may last significantly longer than a FTP session. In order to consider this factor while doing load balancing and thus to increase the performance of load balancing of data connections, the new measure of load capacity as explained hereinabove is used.

Indeed, as mentioned earlier, the new measurement for load capacity takes into consideration the time dimension so as to define a variable with two factors. The new measurement is referred to as the capacity area and is defined as a number of data connections multiplied by a time period. Thus, the capacity area can be represented by the area 216 as shown in FIG. 3. The time period can be determined, by the processor 104 in the system 100 or configured manually, for example. Depending on the desired accuracy in the load balancing system, 300, the time period can be set to 1 millisecond or 3 seconds, i.e. the time period is configurable.

During the time period, the traffic nodes $304_1$ to $304_n$ receive and establish the data connections according to an available global maximum load capacity, which is usually a maximum load capacity granted to the cluster. At the end of the time period, each traffic node, $304_1$ to $304_n$, broadcasts its current load capacity (i.e. the load capacity that has been actually used), to each of the other nodes of the cluster. By so doing, each traffic node, $304_1$ to $304_n$, knows the current load capacity of every other node.

For example, a broadcast message from the traffic node $304_1$ (or TN1) of FIG. 4 could be TYPE 1(X) and TYPE 2(Y), where TYPE 1 or 2 define different types of data connections, such as chat and FTP, and X and Y correspond to the current load capacity.

The traffic node $304_1$ also receives the broadcast messages of the other traffic nodes of the cluster. It can receive the current load capacities, such as 12, 14, 10, etc., from the other traffic nodes. Then the traffic node $304_1$ can add those values up, including its own current load capacity, in order to obtain a total load capacity and compare it to the maximum load capacity of the cluster.

Concerning the maximum load capacity, it may be computed using a maximum number of data connections that is granted by a license server (not shown) to the cluster of nodes, for example. The maximum number of data connections is usually bought by the operator of a network from the license server. Thus, the maximum load capacity is generally a fixed value and it is shared among the different traffic nodes of the cluster. However, each traffic node can have a local target of load capacity, which corresponds to the local maximum load capacity, for example.

Now, turning to FIG. 5, a traffic node, such as $304_1$, according to a non-restrictive illustrative embodiment of the present invention will be described.

The traffic node $304_1$ comprises a controller 306, a type identifier 308, a counter 310, the system 100, a broadcasting module 312, and a comparator 314. Of course, the node also comprises a plurality of other components (not shown), such as other processors and a memory for performing some other tasks and functions, in addition to the tasks and functions of the present invention.

The load balancing node 302 distributes data connections to the traffic node $304_1$ and the controller 306 is in charge of accepting them. The controller 306 is connected to the type identifier 308.

The type identifier 308 can be optional. However, it is useful for identifying the type or category of the data connections distributed by the load balancing node 302 to the traffic node $304_1$. Thanks to the type identifier 308, different throttling corresponding to specific type of data connections can be performed. The type identifier 308 is connected to the counter 310.

The counter 310 counts the number of data connections which have been accepted by the controller 306. The counter 310 can also track the duration of each data connection. The counter 310 is incremented as the data connections are established by the controller 306. Also, the counter 310 can contain a plurality of sub-counters (not shown), for tracking each data connection according to its category or type, identified by the type identifier 308. The counter 310 basically tracks the data connections and provides a number of data connections that are or have been established in the present node within a time period. At the end of the time period, the counter 310 feeds that number or an indication of such number to the input 102 of the system 100. Then the processor 104 of the system 100 computes a current load capacity for the traffic node. Next, the computed current load capacity is given to the broadcasting module 312, which is connected to the system 100. The broadcasting module 312 then broadcasts the current load capacity to all the other nodes of the cluster. The broadcasting module 312 is also connected to the comparator 314.

The broadcasted current load capacity of each other node is received in the traffic node $304_1$ and given to the comparator 314 for example. The comparator 314 then calculates a total load capacity by adding up all the current load capacities received from the other nodes and including the current load capacity from its own node. Of course, people skilled in the art would understand that other operations, such as using a weight or a factor, can be included in the addition operation.

The total load capacity is then compared to the maximum load capacity computed by the processor 104 for the whole cluster. During the comparison, the comparator 314 can also calculate a difference value between the total load capacity and the maximum load capacity.

Also, the controller 306 is generally in charge of making sure that all the components of the traffic node $304_1$ work well. Furthermore, the controller 306 can comprise a clock (not shown). This clock can be synchronized with the Network Time Protocol (NTP) so that the clock of each traffic node is synchronized with each other and thus a same time period can be defined for all the nodes for the cluster.

It should be noted that the controller 306, the type identifier 308, the counter 310, the system 100, the broadcasting module 312, and the comparator 314 can be a piece of software, a piece of hardware or a combination thereof. Also, they can be viewed as functional parts of a main processor, meaning that the separation is only functional, a single processor can be used to perform the different functions. Furthermore, they may be implemented in a same piece of hardware or in separate pieces.

It should be understood that the other nodes from the cluster have substantially the same elements as the traffic node $304_1$ which has been described hereinabove.

Now turning to FIG. 6, a method 400 for load balancing data connections over at least two time periods, a first and second periods, for the cluster of nodes, $304_1$ to $304_n$, will be described. Before starting method 400, a time period is determined by the processor 104 or manually configured. Then, for each time period, a maximum load capacity for the cluster of nodes is calculated through the multiplication of the maximum number of data connections with the time period. The maximum load capacity is to be shared over the cluster of traffic nodes. Thus, the maximum load capacity can be considered as a global maximum load capacity. And each traffic node can have a local maximum load capacity for example. During the time period, data connections are received from the load balancing node 302 and established by the controller 306 of each traffic node $304_1$ to $304_n$.

At the end of the first period, in step 402, each traffic node receives at least one current load capacity from the other nodes of the cluster.

In step 404, a total load capacity is calculated. The total load capacity is generally the summation of all the received current load capacities and including its own current load capacity. However, some variations can be performed so as to obtain a weighted summation, for example.

In step 406, the calculated total load capacity is then compared with the maximum load capacity.

If the total load capacity is lower than the maximum load capacity, then in the next time period, the traffic node can accept a number of data connections, in step 408. The number of accepted data connections can be determined in several ways. For example, during the comparison at step 406, a difference value can be also computed between the total load capacity and the maximum load capacity. Thus, the number of accepted connections can correspond to the difference value. However, a proportional approach can be also taken. For example, the number of accepted data connections can reflect the same proportion as the current load capacity of the traffic node with respect to the maximum load capacity. In this case, a ratio of the difference value over the maximum load capacity is calculated. Also, people skilled in the art would understand that other ways of adjusting the number of connections to be accepted or released in the next time period are possible.

However, if the total load capacity is not lower than the maximum load capacity (i.e. it is higher or equal), then in the next time period, the traffic node should release a number of data connections (active mode), in step 410; this number can be also referred to as the target number of connections to be released. The target number of released data connections can be calculated in the same way as the number of accepted data connections. However, it is also possible that the traffic node just waits for the connections themselves to be completed (passive mode). In this case, no new connections can be accepted.

Thus, by using such a method, the maximum load capacity becomes more flexible, meaning that it is possible that the maximum load capacity for the cluster of traffic nodes may be exceeded during a time period. In that case, a number of connections are released in the following time period so that the total load capacity of the nodes becomes lower than the maximum load capacity in the following time period. Therefore, method 400 allows for some fluctuations over at least two time periods but, in the average, the maximum load capacity of the cluster is respected.

Next, a concrete example of such adjustment is explained with reference to FIG. 7.

Let's assume that the maximum load capacity to be shared over a cluster of 3 nodes is 30 for each time period and that the node TN1 has a local maximum load capacity of 1, the second node TN2 of 6 and the third node TN3 of 23. Also each time period is assumed to be 1 second.

At the end of the first time period, let's assume that the current load capacity of the traffic node TN1 is 1, the current load capacity for the traffic node TN2 is 3 and the current load capacity of the traffic node TN3 is 8. Each row of the table in FIG. 7 represents a time period. The current load capacity values are broadcasted between the traffic nodes at the end of each time period. In this case, after the first time period, the total load capacity is computed to be 12, which is then compared to 30 (the maximum load capacity for the cluster of 3 nodes). The total load capacity is lower than the maximum load capacity by 18, thus, in the second time period, 18 more connections can be accepted.

In the second time period, the traffic node TN1 does not accept any additional data connections and stay at one connection. The second node TN2 accepts 2 more data connections, for example. The third traffic node TN3 accepts 12 additional data connections to reach 20 data connections. Then at the end of the second time period, the total load capacity yields 26, which is still lower than the maximum load capacity.

Next, in the third time period, the node TN1 stays at one data connection, the node TN2 accepts one more data connection and the node TN3 accepts 8 more data connections. Then, at the end of the third time period, the total load capacity yields 36, which is higher than the maximum load capacity of 30, thus, there is a capacity overload. In this case, no new data connections will be accepted in the next time period (or until the capacity overload situation has disappeared). For example, in the active mode, a target number of existing data connections are to be released in the next time period. More specifically, at least 6 data connections are to be released. And in the passive mode, the traffic node TN1 just lets the data connections to be closed by themselves.

The allocation of the at least 6 data connections to be released in the next time period can be done as follows, using a proportional approach and starting from the traffic node having the least connections.

First a ratio is calculated between the overload capacity and the maximum load capacity. In the present case, the ratio is 20% (=6/30).

Then the ratio is applied in each node for calculating the number of data connections to be released.

In the node TN1, there is only one data connection, thus no data connection is to be released because it is assumed that at least one data connection should be present.

In the node TN2, the number of data connections to be released should correspond to 20% of 7 data connections, which gives 1.4, or truncated to be 1 data connection.

In the node TN3, 20% of 28 data connections give 6 data connections. However, since the node TN2 is releasing one data connection, the node TN3 can also release only 5 data connections, for a total of 6 data connections to be released, but let's assume that 6 data connections will be released.

So, in the fourth time period, after performing the release of the calculated number of data connections in each node, the node TN1 has 1 data connection, the node TN2 has 6 data connections and the node TN3 has 22 data connections. At the end of the time period, the total load capacity becomes 29, which is lower than the maximum load capacity. The capacity overload situation is then over. And in the following time period, one more data connection can be accepted. Thus, over the time periods, the current load capacities of the nodes are adjusted with respect to the maximum load capacity for the cluster of nodes.

The innovative teachings of the present invention have been described with particular reference to numerous exemplary implementations. However, it should be understood that this provides only a few examples of the many advantageous uses of the innovative teachings of the invention. In general, statements made in the specification of the present application do not necessarily limit any of the various claimed aspects of the present invention. Moreover, some statements may apply to some inventive features but not to others. In the drawings, like or similar elements are designated with identical reference numerals throughout the several views, and the various elements depicted are not necessarily drawn to scale.

What is claimed is:

1. A method for load balancing data connections in a cluster of traffic nodes over at least first and second time periods, the method comprising the steps of:
    determining a number of data connections established by a first traffic node of the cluster in a first time period;
    computing a load capacity of the first traffic node by multiplying the number of established data connections with the duration of the first time period;
    computing a maximum load capacity for the cluster by multiplying a maximum number of data connections available for the cluster with the duration of the first time period;
    receiving a load capacity of a second traffic node from a second traffic node of the cluster;
    comparing a sum of the load capacity of the first traffic node and the load capacity of the second traffic node to the maximum load capacity for the cluster;
    if the sum is greater than the maximum load capacity for the cluster, waiting for a number of data connections to be closed by themselves in the second time period;
    if the sum is lower than the maximum load capacity for the cluster, accepting a number of data connections in the second time period.

2. A method as defined in claim 1, further comprising:
    accepting additional data connections within the first time period if the maximum load capacity for the cluster is not reached yet; and
    refusing data connections within the first time period if the maximum load capacity for the cluster is reached.

3. A method as defined in claim 1, further comprising broadcasting the computed load capacity of the first traffic node to the second traffic node.

4. A method as defined in claim 1, wherein the maximum number of data connections available for the cluster includes an indication of a maximum number of data connections available for a given type of data connections.

5. A method as defined in claim 1, wherein comparing the sum of the load capacity of the first traffic node and the load capacity of the second traffic node to the maximum load capacity for the cluster comprises:
    calculating a difference value between the sum and the maximum load capacity for the cluster; and
    calculating a ratio between the maximum load capacity for the cluster and the difference value.

6. A method as defined in claim 5, wherein accepting a number of data connections in the second time period comprises accepting a number of data connections corresponding to the ratio.

7. A method as defined in claim 5, wherein comparing the sum to the maximum load capacity for the cluster further comprises releasing a number of data connections in the second time period, if the sum is greater than the maximum load capacity for the cluster.

8. A method as defined in claim 7, wherein releasing the number of data connections comprises releasing a number of data connections corresponding to the ratio.

9. A method as defined in claim 1, wherein computing the load capacity of the first traffic node comprises representing the load capacity as an area.

10. A traffic node for load balancing data connections in a cluster of traffic nodes over at least a first and second time periods, the traffic node comprising:
    a counter for determining a number of data connections established by the traffic node in a first time period;
    a processor for computing a load capacity of the traffic node by multiplying the number of established data connections with the duration of the first time period and further for computing a maximum load capacity for the cluster by multiplying a maximum number of data connections available for the cluster with the duration of the first time period;
    an input for receiving a load capacity of a second traffic node from a second traffic node of the cluster; and
    a comparator for comparing
        a sum of the load capacity of the traffic node and the load capacity of the second traffic node to the maximum load capacity for the cluster;
        if the sum is greater than the maximum load capacity for the cluster, waiting for a number of data connections to be closed by themselves in the second time period;
        if the sum is lower than the maximum load capacity for the cluster, accepting a number of data connections in the second time period.

11. A traffic node as defined in claim 10, further comprising a controller for accepting additional data connections within the first time period if the maximum load capacity for the cluster is not reached yet and and for refusing data connections within the first time period if the maximum load capacity for the cluster is reached.

12. A traffic node as defined in claim 11, further comprising a broadcasting module for broadcasting the computed load capacity of the traffic node to the second traffic node.

13. A traffic node as defined in claim 11, wherein the comparator calculates a difference value between the sum and the maximum load capacity for the cluster and a ratio between the maximum load capacity for the cluster and the difference value.

14. A traffic node as defined in claim 13, wherein the controller accepts a number of data connections corresponding to the ratio if the sum is lower than the maximum load capacity for the cluster, in the second time period.

15. A traffic node as defined in claim 13, wherein the controller releases a number of data connections corresponding to the ratio if the sum is greater than the maximum load capacity for the cluster, in the second time period.

16. A traffic node as defined in claim 10, wherein the counter includes sub-counters for counting a number of established data connections of a given type.

* * * * *